United States Patent [19]
Kieran

[11] Patent Number: 5,308,237
[45] Date of Patent: May 3, 1994

[54] CONTAINER EJECTION SYSTEM

[75] Inventor: Thomas G. Kieran, Phoenix, Ariz.

[73] Assignee: Star Container, Inc., Phoenix, Ariz. ; a part interest

[21] Appl. No.: 908,034

[22] Filed: Jul. 6, 1992

[51] Int. Cl.$^5$ .................. B29C 33/46; B29C 49/70
[52] U.S. Cl. ............................. 425/437; 294/64.1; 294/64.3; 425/534; 425/537
[58] Field of Search ............... 425/537, 534, 437, 351, 425/422; 294/64.1, 64.3; 249/66.1

[56] References Cited

U.S. PATENT DOCUMENTS

| | | | |
|---|---|---|---|
| 1,060,948 | 5/1913 | Schuster | 53/299 |
| 3,033,604 | 5/1962 | Ammon | 294/64.1 |
| 3,311,400 | 3/1967 | Rowekamp | 294/119.3 |
| 3,632,261 | 1/1972 | Gasior et al. | 425/534 X |
| 4,441,878 | 4/1984 | Harry | 425/534 |
| 4,610,473 | 9/1986 | Hawkswell | 294/64.1 |
| 4,650,233 | 3/1987 | Mang et al. | 294/64.1 |
| 4,705,311 | 11/1987 | Ragard | 294/64.1 X |
| 4,735,449 | 4/1988 | Kuma | 294/64.3 |
| 4,858,974 | 8/1989 | Stannek | 294/64.1 X |
| 4,923,363 | 5/1990 | DiFrank | 294/64.1 X |
| 5,156,798 | 10/1992 | Bruning | 425/537 X |

Primary Examiner—Richard L. Chiesa
Attorney, Agent, or Firm—LaValle D. Ptak

[57] ABSTRACT

A PET bottle forming machine used to mold clear plastic bottles of the type now widely used for mayonaise jars, cosmetic jars, perfume jars and the like, is modified to reduce the potential damage to such jars or containers at the time they are released from the machine. The machine includes an ejector pad, which enters into the open end of the container to center the container at the time a lip spreader operates to part the lip forming portion to release the container. The ejector pad is mounted on the end of a hollow rod, which extends through the pad. When the ejector pad is inserted into the open end of the container at the time of release, a vacuum is applied through the hollow rod to cause the container to be secured to the ejector pad. The hollow rod, with the ejector pad and container releaseably secured to it, then is lowered to place the bottom of the container on a support surface, at which time the vacuum is removed to release the container from the ejector pad. The support rod and ejector pad then are raised to an initial starting position for a repeat of the cycle.

15 Claims, 3 Drawing Sheets

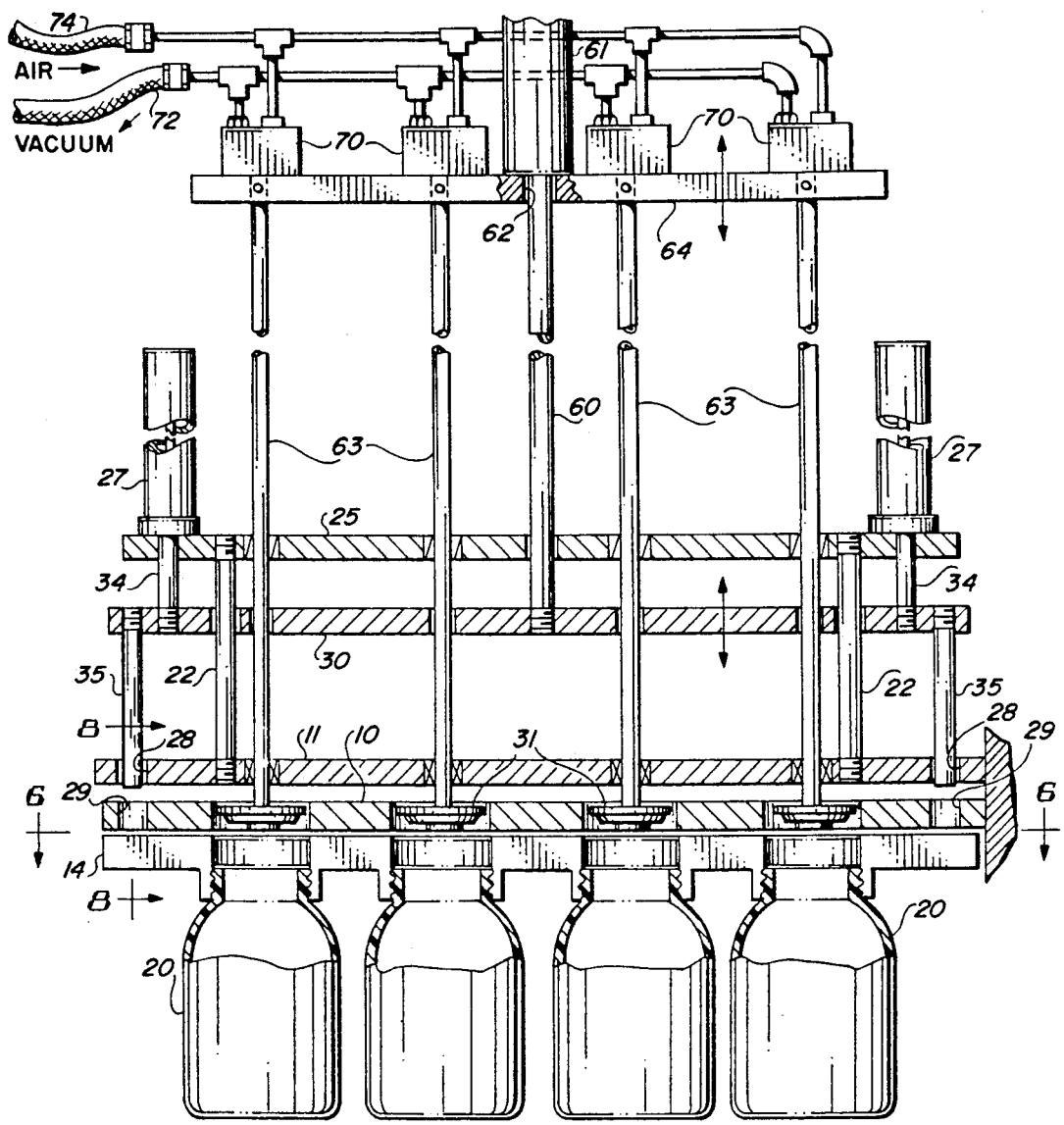

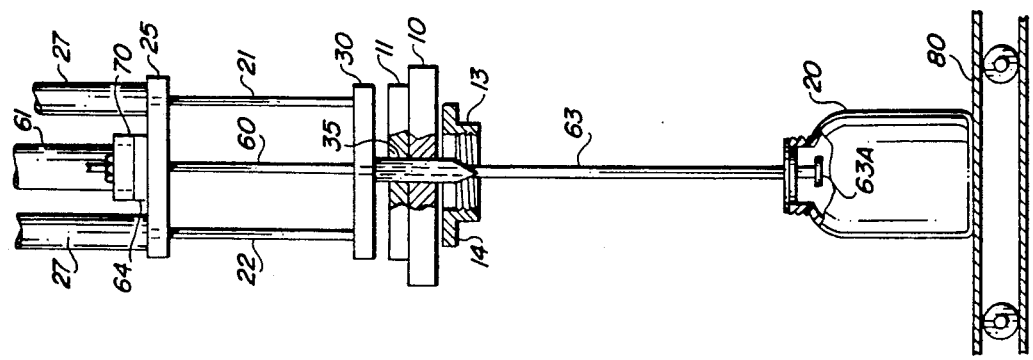
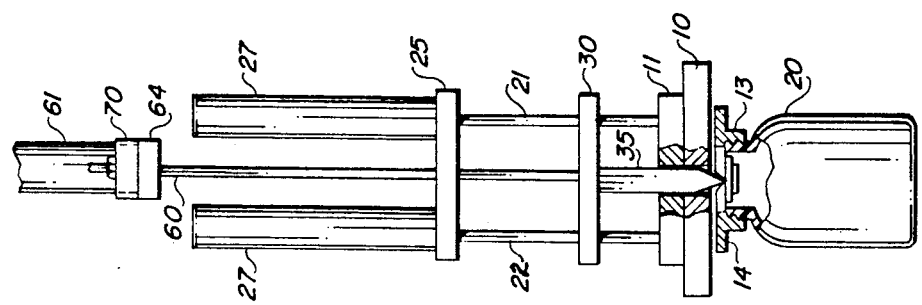
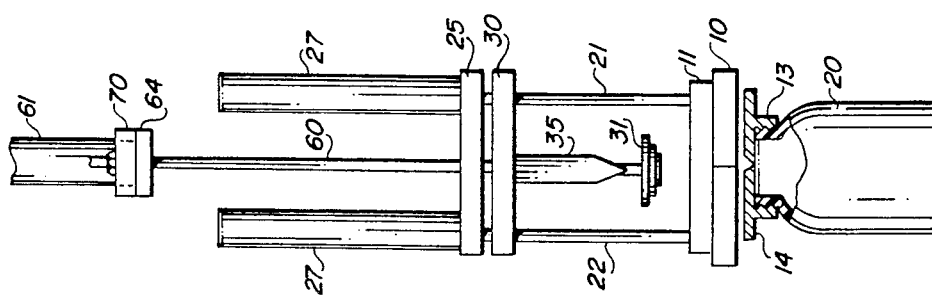
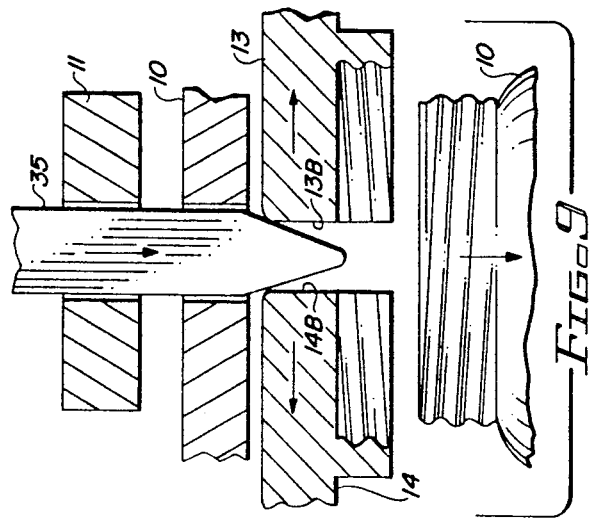
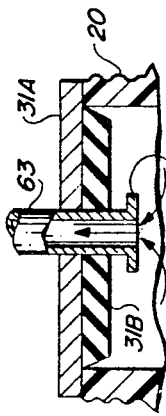
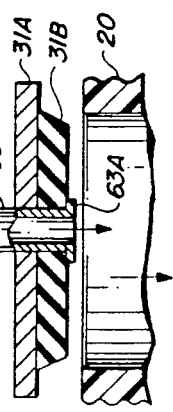

CONTAINER EJECTION SYSTEM

BACKGROUND

Containers for a wide variety of products typically have been made of glass, steel or aluminum. In the beverage industry today, the smaller containers usually are made of aluminum, while PET plastic containers currently are used for larger sizes (1 and 2 liters, for example). While many applications for steel, aluminum or paperboard containers exist, these containers are not suited for applications where it is desirable for the contents to be visible through the container. In this latter case, glass containers have been in widespread use for many years.

A major disadvantage of glass containers, however, is that the containers necessarily are quite heavy if they are manufactured to be sufficiently strong to resist breakage. Even so, breakage is a common occurrence with glass containers; and the weight of glass containers significantly increases the shipping costs of whatever product is packaged within them.

Because of the inherent disadvantages of glass containers, the use of strong distortion-free lightweight plastic PET containers for products such as condiments, cosmetics, perfumes and the like has increased.

Machines for manufacturing clear PET plastic bottles or jars of the type widely used for mayonnaise, mustard, vegetables, pickles, cosmetics, perfumes and the like, typically are multi-stage molding machines. Frequently, the bottles or containers which are formed by these machines are clear, colorless plastic. In many applications, the bottle or container must be flawless (that is it must be without scratches or other imperfections) or it will be rejected by the packer who uses the container for packaging its product.

In prior art multi-stage PET bottle making machines, the bottles formed by the machine are released from the final stage, and are permitted to drop into a bin or container located beneath the machine, or are dropped onto a slide which directs them to a bin or container located adjacent the machine. Whichever of these prior art techniques are used, the bottles or containers fall against one another in random positions and must be removed from the containers by some means, typically manually, and packed for shipping. Alternatively, the bottles or containers are removed from the bins into which they are dropped; and they are placed on a conveyor or other apparatus for transport to a filling machine. All of this handling and the dropping of newly formed bottles into the container on top of bottles already in the container, results in scratches and damage to the bottles. Consequently, additional inspection is required; and containers are rejected as a result of damage caused by dropping them from the molding machine.

Various types of lifting and transporting mechanisms using vacuum pickup heads have been devised for various applications for moving articles from one point to another with minimum mechanical contact to the article being transported or moved by the mechanism. The patent to Ammon U.S. Pat. No. 3,033,604 is directed to a vacuum device for lifting and transporting cylindrical articles. The device of Ammon includes a centering ring surrounding the vacuum pickup heads; so that the articles are accurately located in the device. Nothing is inserted into the interior or open end of an article being moved; but the device makes contact with the closed end of a cylinder.

The patents to Hawkswell U.S. Pat. No. 4,610,473; Mang U.S. Pat. No. 4,650,233; Ragard U.S. Pat. No. 4,705,311; and Stannek U.S. Pat. No. 4,858,954 all are directed to different types of vacuum pickup devices, many of them used in the electronics industry for transporting integrated circuit parts from one position to another. None of these patents, however, are directed to a mechanism for transporting or handling open-ended containers such as plastic PET bottles.

It is desirable to provide a mechanism for use with a molding machine, particularly a PET molding machine, which overcomes the disadvantages of the prior art mentioned above, which is simple and effective in operation, and which eliminates the dropping and random orientation of bottles delivered from the final stage of such machines.

SUMMARY OF THE INVENTION

Accordingly, it is an object of this invention to provide an improved article transport mechanism.

It is another object of this invention to provide an improved ejection mechanism for removing articles from a molding machine.

It is an additional object of this invention to provide an improved mechanism for removing PET bottles from the lip plates of a final stage of a PET bottle forming machine which minimizes potential damage to the bottles formed by the machine.

It is a further object of this invention to provide an improvement for existing PET bottle forming machines, which operates in conjunction with the ejection mechanism of such machines to place articles formed by the machine on a surface located below the machine in a manner which reduces the potential for damage to the articles.

In accordance with a preferred embodiment of the invention, a machine for molding a hollow, open-ended container, such as a PET container, has lip forming portion from which the container is suspended in a final stage of operation of the machine. In addition, the machine has an ejector pad for entrance into the open end of the container to center the container at the time a lip spreader operates to part the lip forming portion to release the container. The support rod for supporting the ejector pad is hollow. When the support rod is moved to cause the ejector pad to engage the open end of the container suspended by the lip forming portion of the molding machine, a vacuum is applied through the hollow support rod to cause the container to be held on the ejector pad after the lip forming portion of the machine releases the container. The container then is released by removal of the vacuum.

In a more specific embodiment of the invention, the support rods are lowered, after the parting of the lip forming portion of the machine, to a position where the container held on the ejector pad is placed on a surface. After placement of the container on a surface, the vacuum is removed to release the container. The support rods and ejector pads then are withdrawn to a start position, and the cycle is repeated.

BRIEF DESCRIPTION OF THE DRAWINGS

FIG. 5 is a partial cross-sectional diagrammatic view of a machine in accordance with a preferred embodiment of the invention;

FIG. 7 illustrates a detail of the machine shown in FIG. 5;

FIG. 8 is an enlarged diagrammatic representation of a portion of the machine shown in FIG. 5;

FIG. 9 is an enlarged diagrammatic representation of a different stage of the operation of the portion shown in FIG. 8;

FIGS. 10A and 10B are enlarged details of a portion of the apparatus shown in FIG. 5;

FIGS. 11A and 11B are diagrammatic end view representations of first and second stages of operation, respectively, of the embodiment shown in FIG. 5; and FIG. 12 is a diagrammatic end view of a third stage of the operation of the embodiment shown in FIG. 5.

DETAILED DESCRIPTION OF THE PREFERRED EMBODIMENT

Figures 1A, 2, 3A:
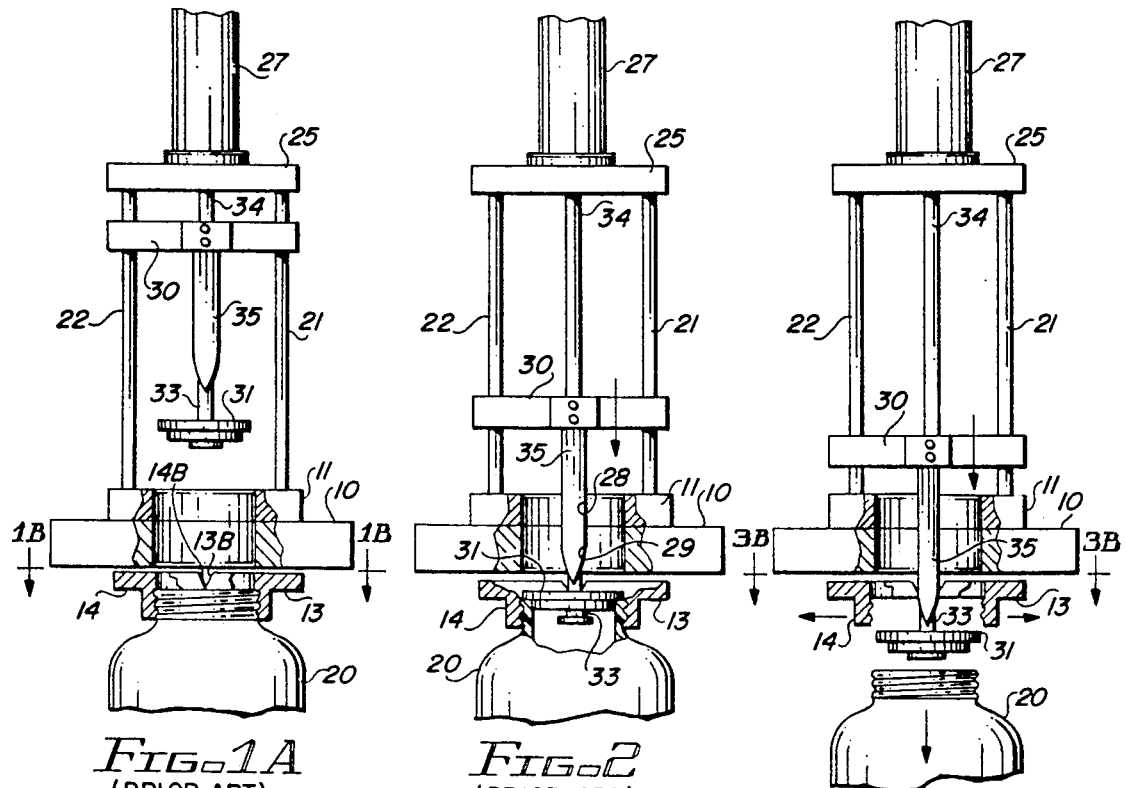
FIGS. 1A and 1B are diagrammatic illustrations of a prior art machine in a first step of its operation.
FIG. 2 is a diagrammatic representation of the machine shown in FIGS. 1A and 1B in a second step of its operation.
FIGS. 3A and 3B are diagrammatic representations of the machine shown in FIG. 1 in a third step of its operation.

Reference now should be made to the drawings, in which the same reference numbers are used throughout the different Figures to designate the same components. FIGS. 1 through 4 are directed to a feature of a prior art PET bottle forming machine, which is modified in accordance with a preferred embodiment of the invention as shown in FIG. 5. The machine, a portion of which is shown diagrammatically in FIGS. 1 through 4, is standard and well known. For that reason, the structure of that machine and the operation of all but the portion shown in FIGS. 1 through 4, has not been illustrated, since the operation of the standard machine is not important to an understanding of the invention here. It is to be noted, however, that the preferred embodiment of the invention which is illustrated in FIGS. 5 through 12 is attached to and operates with components of the standard pre-existing machine, which is illustrated in FIGS. 1 through 4.

In FIGS. 1A and 1B, 2, 3A and 3B, the operation of a multi-stage PET bottle forming machine at the final stage, where the formed bottles are discharged from or released from the machine, is illustrated. The machine includes a base 10 which is secured to a frame (not shown), on which other parts of the machine (not shown) also are mounted. Located directly above the base 10 is a support structure 11, which has sets of right and left support posts 21 and 22 attached to it and extending upwardly from it. These support posts are secured at the upper ends to an upper support platform 25, on which an air cylinder 27 is mounted.

Figures 1B, 3B, 4:
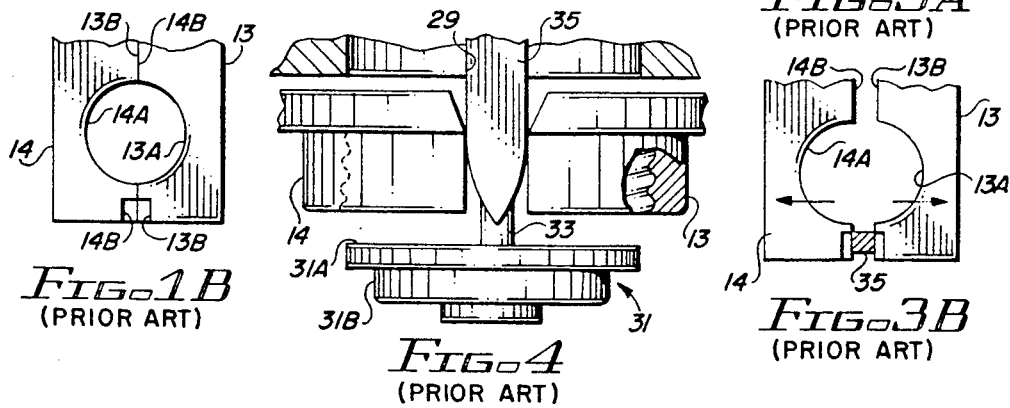
FIG. 4 is an enlarged diagrammatic representation of a portion of the prior art machine in the operating step shown in FIG. 3A.

Located beneath the base 10 and below a circular cavity or passageway through the base 10 and support member 11 is the lip forming portion of the mold, which is used to form the PET bottles. This lip forming portion comprises two lip plates 13 and 14 having inner semi-circular portions 13A and 14A (FIG. 1B), respectively, located in them to form the threads on the outside of the lip or neck of the jar 20 which has been formed at other stages of the machine. At this final stage, the lip plates 13 and 14 are rotated to the position shown beneath the frame 10, as illustrated in FIG. 1A. The lip plates abut one another, as shown in FIG. 1B, to hold the jar 20 by the threaded neck as illustrated in FIG. 1A.

The device in the position shown in FIG. 1A then has the air cylinder 27 drawn to its uppermost position, with a shaft 34 extending outwardly from the center of the cylinder 27 and attached to a piston located inside the cylinder. The shaft 34 is attached at a convenient position to a movable plate 30, which is journaled to slide vertically on the support rods 21 and 22. The plate 30 also carries, at spaced positions along a plane extending vertically into the plane of the sheet on which FIGS. 1 through 4 are drawn, a lip spreader wedge 35 which is pointed or wedge-shaped at its lower tip. The wedge 35 is aligned with a pair or facing cam surfaces on edges 13B and 14B of the lip spreader plates 13 and 14, respectively.

An ejector pad 31 is carried on the end of a shaft 33, which is attached to the plate 30 spaced inwardly from the wedge 35 (as viewed in FIG. 1A) to align the ejector pad 31 with the circular opening formed above the portions 13A and 14A of the lip plates 13 and 14, respectively. When release of the jar or container 20 is desired, the sequence of operation illustrated in FIGS. 2, 3A and 3B takes place. As illustrated in FIG. 2, the air cylinder 21 operates to move the plate 30 downwardly from the position shown in FIG. 1A. This initially causes the ejector pad 31 to extend a stepped inner portion into the interior of the jar 20, with an outer portion engaging the top edge of the lip of the jar 30, as illustrated in FIG. 2.

The ejector pad 31 is slidably mounted on the shaft 33, which is permitted to pass downwardly a slight distance through the ejector pad 31 to compensate for any variations in positions of the upper edge of the lip of the jar 20 which might exist at different times in the operating sequence of the machine. To prevent the ejector pad 31 from falling off the bottom of the shaft 33, an outwardly projecting flange or other suitable structure is employed. As can be seen from FIG. 2, when the ejector pad 31 is in place, the spreader wedge 35 has the tip just entering the cammed surfaces in the edges 13B and 14B. At this point, as shown in FIG. 2, the lip plates 13 and 14 still are abutting one another in the same position shown in FIG. 1A; so that the jar 20 still is held by the lip plates 13 and 14.

Further downward movement of the shaft 34 under the operation of the air cylinder 27 allows the movable plate 30 to reach the lowermost position shown in FIG. 3A. In this position, the lip spreader wedge 35 is extended fully between the lip plates 13 and 14, as illustrated in enlarged detail in FIG. 4. Consequently, the lip plates 13 and 14 move outwardly in the direction of the arrows shown in FIG. 3A; and the jar 20 is permitted to drop free. The ejector pad 31 prevents the threads on the outside of the lip of the jar 20 from being damaged during this operation, since the ejector pad 31 centers the jar and prevents it from being pulled to one side or the other while the lip plates 13 and 14 move apart, as illustrated in FIGS. 3A and 3B.

The apparatus which is shown in FIGS. 1 through 4, and which has been described above, is standard and currently is in widespread use for effecting the final release of a PET bottle or jar from a multiple station mold.

FIG. 5 illustrates a preferred embodiment of the invention in the form of a modification to the machine which has been described above in conjunction with FIGS. 1 through 4. The embodiment of the invention shown in FIG. 5 operates to prevent the free fall of the bottle or container 20 from the machine, since such free fall has been found to result in scratching or other damage to bottles and containers formed in standard machines. In the machine shown in FIG. 5, and described in conjunction with FIGS. 5 through 12, no free fall of bottles 20 takes place. Instead, the bottles 20 are gently and securely lowered onto a support surface without dropping them from the machine at the time the lip plates 13 and 14 are parted.

Figure 6:
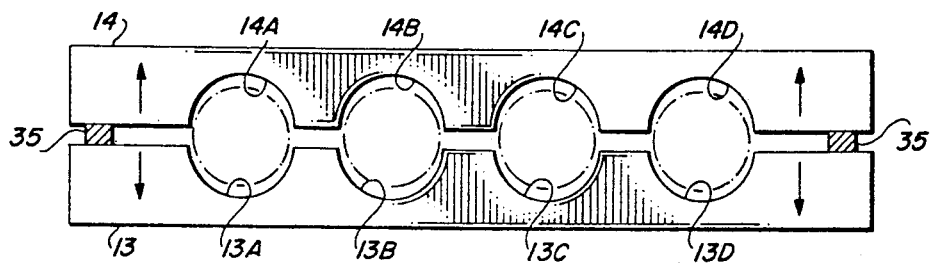
FIG. 6 is a top view of a portion of the machine shown in FIG. 5.

Those components of the machine illustrated in FIG. 5, which are common to the prior art machine of FIGS. 1 through 4, are provided with the same reference numbers. Instead of showing the machine of FIG. 5 in an end view, however, a side view of the machine, showing four identical bottle forming positions, is illustrated. FIG. 6 is a top view of a four-position lip spreader plate, which in all other respects is identical to the portions of the lip spreader plates shown in FIGS. 1B and 3B.

A primary modification to the machine of FIGS. 1 through 4 is the attachment of an elongated rod 60 to the movable plate 30 (at its center, as shown in FIG. 5). The rod 60 terminates in its upper end in a piston (not shown) in an air cylinder 61, which is attached to a plate 64. The rod 60 passes through a circular opening 62 in the plate 64; so that the plate 64 is free to move up and down, as indicated by the arrows, on the rod 60 as the piston within the air cylinder 61 moves between its lowermost position within the cylinder (the position shown in FIG. 5) to the uppermost position where it extends deeply into the cylinder 61 and terminates near the upper end (not shown) thereof.

As illustrated in FIG. 5, the plate 64 is shown in its uppermost position, which is the "start" position of operation of the apparatus. Also, as illustrated in FIG. 5, the pistons of the air cylinders 27 cause the rods 34 to be drawn upwardly to the uppermost position, pulling the plate 30 to the position shown. In this position, the ejector pads 31 and the lip spreader wedges 35 are out of engagement with the bottles 20 and the lip spreader plates 13 and 14, respectively. This corresponds to the start position of the prior art device of FIG. 1A, and also is illustrated as the start position of the apparatus in the diagrammatic end view of FIG. 11A.

The support rod 33 of the prior art device shown in FIGS. 1 through 4, is replaced in the embodiment of FIG. 5 with a hollow support rod 63, a portion of which is shown in greater detail in FIG. 7. The support rods 63 are rigid and have the ejector pads 31 slidably mounted on their lower ends, in the same manner the ejector pads 31 of the prior art machines are mounted on the lower ends of the solid support rods 33. The upper ends of the rods 63 are connected to the plate 64, and terminate in a valve 70 for each of the rods 63. The valves 70 are connected to a vacuum line 72 and an air line 74, respectively; and the valves 70 are controlled to apply either a vacuum to the hollow rods 63 through the line 72, connected to a suitable vacuum source (not shown) or to air under pressure, through a line 74, also connected to a source of pressurized air (not shown).

Reference now should be made to FIGS. 7 through 10 taken in conjunction with FIGS. 11A, 11B and 12 for the operating sequence of the embodiment of the invention shown in FIGS. 5 and 6.

As is apparent from an examination of FIG. 5, the hollow support rods 63, which carry the ejector pads 31 on their lower ends, are not attached to the plate 30 (as was the case of the support rods 33 of the prior art embodiments of FIGS. 1 through 4). Instead, the rods 63 pass through holes or bushings in the plates 11, 30 and 25 and are attached to and move with the plate 64, as described above. Consequently, movement of the support rods 63 to the different positions of operation in the machine is dependent upon the movement of the plate 64.

It should be noted, however, that when the plate 30 is lowered by means of the action of the air cylinders 27 to extend the rods 34, the plate 64 initially moves parallel to and in conjunction with the plate 30, because of the attachment of the piston rod 60 of the air cylinder 61 to the plate 30. The result of this is the lowering of the plate 64, along with the air cylinder 61 and all of the valves 70, which are attached to the top of the plate 64, from the position shown in FIG. 11A to the position shown in FIG. 11B, which is comparable to the operating position of the prior art machine shown in FIG. 2. At this point, the ejector pads 31 are seated on the top of each of the jars 20. This is shown most clearly in FIG. 10A which illustrates how the portion 31B extends inside the container 20 with the portion 31A resting on the top of the container 20 essentially to seal off the top of the container.

The portion 31B of the pad 31 centers the container 20 between the lip plates 13 and 14 in the same manner described above in conjunction with the prior art embodiment shown in FIGS. 1 through 4. As illustrated in FIG. 10A, the lower end of the support rod 63 extends slightly below the bottom of the portion 31B of the ejector pad 31. This amount of sliding play of the pad 31 on the rod 63 is employed to compensate for slight variations in the actual position of the top of each of the containers 20 in the operation of the machine. An outwardly extending flange 63A is placed at the bottom of each of the support rods 63; so that when the support rods 63 subsequently are withdrawn upwardly to the position shown in FIGS. 5 and 11A, the ejector pads 31 are pulled upwardly with the rods 63 (as shown most clearly in FIG. 10B).

Once the apparatus reaches the position shown diagrammatically in FIG. 11B, the lip spreader wedges 35 on opposite ends of the lip spreader plates 13 and 14 (see FIGS. 5 and 6), are at the point immediately prior to the spreading apart of the lip plates 13 and 14. At this point, the ejector pads 31 are in the position shown in FIG. 10A, and the valves 70 are operated by a control mechanism (not shown) to apply a vacuum from the line 72 through each of the hollow rods 63 to the interior of each of the bottles or containers 20, which are at each of the four different positions shown in FIG. 5. This vacuum is indicated by means of the arrows in FIG. 10A, and causes the containers 20 to be securely held against the ejector pads 31 in the position shown in FIG. 10A.

Continued downward movement of the plate 30 under the control of the air cylinders 27 occurs until the plate 30 and the lip spreader wedges 35 reach the position shown in FIG. 12. Simultaneously with this operation, the air cylinder 61 is operated to permit the rod 60 to drive the piston on the upper end thereof toward the upper end (not shown) of the cylinder 61 permitting the cylinder 61 and the plate 64 to drop downwardly until the plate 64 rests on top of the plate 25. This position is shown in FIG. 12, which is an end view of the apparatus. In FIG. 12 it can be seen that the center area between the front and rear edges of the plate 25 is clear to permit the plate 64 and the apparatus carried by it to drop between the air cylinders 27 to the position shown.

This operation causes the support rods 63 to extend downwardly a considerable distance below the spread-apart lip plates 13 and 14, as illustrated in FIG. 10. The distance of this extension below the lip plates 13 and 14 is established in accordance with the actual parameters of the machine in which the apparatus is mounted. Obviously, the length of the rods 63, which extend below the plates 13 and 14, represents the amount by which the rod 60 extends upwardly into the air cylinder 61 (less the distance travelled by the plate 30 between the plate 25 and the top of the plate 11 under the control of the air cylinders 27).

During the time that the containers 20 are lowered from the position shown in FIG. 11B to the position shown in FIG. 12, they are held firmly attached to the ejector pads 31 by means of the vacuum produced through the vacuum line 72. When the bottoms of the containers 20 are placed on the top of a conveyor 80 or other suitable receiving surface, the valves 70 are operated by control mechanism (not shown) to switch from the vacuum line 72 to an air pressure line 74. This produces a positive pressure to disengage the ejector pads 31 from the top of the containers 20. At this point, the air cylinder 61 is operated to extend the rod 60 out of the air cylinder 61. This, in effect, raises the plate 64 to its uppermost position relative to the plate 30, as illustrated in FIG. 5. Once the ejector pads 31 have passed upwardly through the opening in the lip plates 13 and 14 and reside in the opening in the main support plate 10, the air cylinders 27 are operated to raise the plate 30 to the position shown in FIG. 5. This is diagrammatically illustrated in FIG. 11A; and the machine is ready to complete another cycle of operation.

FIGS. 8 and 9 are enlarged detail views of the operation of the lip spreader wedge 35 prior to contact with the lip plates 13 and 14, and after insertion between the edges 13B and 14B of the lip plates 13 and 14, to effect the release of the upper lip of the jar or container 20 from the lip plates, in the manner described previously.

The foregoing description of the preferred embodiment of the invention should be considered as illustrative, and not as limiting. As noted above, mechanisms for controlling the operating sequence of the different air cylinders, as well as the mechanism for the well known portions of the machine have not been shown in order to avoid cluttering of the drawings. The mechanisms and apparatus, which have been added to the standard machine for effecting the gentle lowering of containers 20 to a conveyor or other suitable support surface, are shown in detail. Although air cylinders have been described in conjunction with the preferred embodiment, other devices such as hydraulic mechanisms, electric motors or the like, may be substituted to effect the desired motion of the different parts which has been described. Various configurations of the ejector pads and lip spreader wedge may be used, or mechanisms for effecting the spreading of the lips may be employed other than the wedge mechanism which is shown. Various other changes and modifications will occur to those skilled in the art, without departing from the true scope of the invention as defined in the appended claims.

I claim:

1. In a machine for molding a hollow open-ended container, said machine having a lip forming portion from which said container is suspended in a final stage of operation thereof, and having an ejector pad for entrance into the open end of said container to center the container at the time a lip spreader operates to part the lip forming portion to release the container, an improvement including in combination;
   a support surface;
   means coupled with the ejector pad for releasably holding a container on the ejector pad following the release of the container from the lip forming portion of the molding machine; and
   means for lowering the ejector pad, with the container releaseably held thereon, to place the container on said support surface after release of the container by the lip forming portion of the molding machine; and
   means for releasing the ejector pad from the container only after the container is placed on said support surface.

2. The combination according to claim 1 wherein said support surface to which the container is lowered is located beneath the lip forming portion of the molding machine at the time the lip forming portion is parted to release the container.

3. The combination according to claim 2 wherein the means for releaseably holding the container on the ejector pad comprises a vacuum means.

4. The combination according to claim 3 wherein the means for releasing the container from the ejector pad comprises means for removing said vacuum.

5. The combination according to claim 4 wherein said support surface on which the container is placed is a conveyor.

6. The combination according to claim 1 wherein the means for releaseably holding the container on the ejector pad comprises a vacuum means.

7. The combination according to claim 6 wherein the means for releasing the container from the ejector pad comprises means for removing said vacuum.

8. A machine for molding a hollow open-ended container, said machine having a lip forming portion from which said container is suspended in a final stage of operation thereof, and having a circular ejector pad for entrance into the open end of said container to center said container at the time a lip spreader operates to part the lip forming portion to release the container, an improvement including in combination;
   said ejector pad having a hole through the center thereof;
   an elongated hollow support rod extending through the hole in said ejector pad for slideably supporting said ejector pad on said support rod;
   means for moving said hollow support rod to cause the ejector pad to engage the open end of the container suspended by the lip forming portion of the molding machine;
   means for applying a vacuum to said hollow support rod when the ejector pad thereon engages the open end of the container to hold the container on the ejector pad after the lip forming portion of the machine releases the container; and
   means for removing the vacuum to release the container.

9. The combination according to claim 8 further including a support surface and wherein said means for moving said support rod moves said support rod, ejector pad and the container held thereon by said vacuum downwardly from the lip forming portion of the molding machine after release of the container to place the container on said support surface while said vacuum is applied thereto, with said means for removing vacuum operated after said container is placed on said support surface.

10. The combination according to claim 9 wherein said means for removing vacuum includes means for applying pressurized air through said elongated hollow support rod therethrough to the interior of the hollow container.

11. The combination according to claim 10 wherein the ejector pad comprises a stepped configuration, a first portion of which enters the interior of the open end of the hollow container and a second portion of which extends over the top edge of the open end of the container.

12. The combination according to claim 11 wherein said hollow support rod is aligned with the central axis of a container suspended by the lip forming portion of the machine.

13. The combination according to claim 8 wherein the ejector pad comprises a stepped configuration, a first portion of which enters the interior of the open end of the hollow container and a second portion of which extends over the top edge of the open end of the container.

14. The combination according to claim 13 wherein said means for removing vacuum includes means for applying pressurized air through said elongated hollow support rod therethrough to the interior of the hollow container.

15. In a machine for molding a hollow open-ended container, said machine having a lip forming portion from which said container is suspended in a final stage of operation thereof, and having an ejector pad for entrance into the open end of said container to center the container at the time a lip spreader operates to part the lip forming portion to release the container, an improvement including in combination;
   a support surface;
   means coupled with the ejector pad for releasably holding a container on the ejector pad following the release of the container from the lip forming portion of the molding machine, said ejector pad having a hole therethrough; and
   a support rod for lowering the ejector pad to said support surface, said support rod extending through the hole in said ejector pad, and having a diameter selected to permit said ejector pad to slide on said support rod, with the container releaseably held on said ejector pad, said support rod having means on the end thereof to prevent said ejector pad from falling off said support rod; and
   means for releasing the ejector pad from the container after the container is placed on said support surface.

* * * * *